United States Patent [19]

Bottasso et al.

[11] 3,922,122

[45] Nov. 25, 1975

[54] APPARATUS FOR MOLDING AN EMBOSSED PATTERN ON THE PERIPHERAL BAND OF A TOROIDAL ARTICLE, IN PARTICULAR ON TIRE TREADS

[75] Inventors: Franco Bottasso; Antonio Pacciarini, both of Milan, Italy

[73] Assignee: Industrie Pirelli S.p.A., Milan, Italy

[22] Filed: Dec. 9, 1974

[21] Appl. No.: 531,076

Related U.S. Application Data

[63] Continuation-in-part of Ser. No. 315,991, Dec. 18, 1972, abandoned.

[30] Foreign Application Priority Data

Dec. 17, 1971 Italy ............................... 32526/71
Oct. 20, 1972 Italy ............................... 30711/72

[52] U.S. Cl. ............................... 425/46; 425/47
[51] Int. Cl.² ............................... B29H 5/08
[58] Field of Search ........................... 425/39, 46, 47

[56] References Cited

UNITED STATES PATENTS

| | | | |
|---|---|---|---|
| 3,337,918 | 8/1967 | Pacciarini et al. | 425/39 |
| 3,460,197 | 8/1969 | Cantarutti et al. | 425/46 |
| 3,682,576 | 8/1972 | Gross | 425/46 |
| 3,741,696 | 6/1973 | Greenwood | 425/46 X |

*Primary Examiner*—J. Howard Flint, Jr.
*Attorney, Agent, or Firm*—Stevens, Davis, Miller & Mosher

[57] ABSTRACT

An apparatus is disclosed for molding an embossed pattern on the peripheral band of a toroidal article, particularly on the tread of a tire, having a mold with upper and lower sidewall sections for pressing the sidewalls of the article and an intermediate section with a plurality of segments for pressing the peripheral band of the article when the mold is closed. The apparatus has driving means to move the segments radially in consequence of their axial displacements, a press to open and close the mold and means for admitting and discharging a curing fluid to cure the article. The driving means are characterized by being able to cause a compression stress between the connected faces of at least two contiguous segments when the mold is assembled and being able to cause a reduction in the stress during molding and curing. This allows the article to be molded and cured outside of the press.

8 Claims, 8 Drawing Figures

APPARATUS FOR MOLDING AN EMBOSSED PATTERN ON THE PERIPHERAL BAND OF A TOROIDAL ARTICLE, IN PARTICULAR ON TIRE TREADS

This is a continuation-in-part of copending application Ser. No. 315,991, filed Dec. 18, 1972, now abandoned.

This invention relates to an apparatus for molding an embossed pattern on the peripheral band of a toroidal article, in particular on the tread of tires which have annular reinforcement structures, i.e., breakers, placed between casing and tread, by means of which it is possible to achieve high rates of production, together with greatly reduced costs and plant size.

As is known, annular reinforcement structures for tires must have high tensile strength and very reduced extensibility. Special care is required to build up a tire provided with a breaker, in order to position the latter symmetrically with respect to the tire casing beneath. In fact, as is known, correct rolling of the tire on the road is dependent on this condition, due to the absence of tangential actions which tend to move it away from the direction of movement of the vehicle.

A process for manufacturing tires with annular reinforcement structure which meet the above requirement is known, and basically it consists of including the sidewalls and beads of the tire between two continuous, symmetrical annular mold sections and bringing the mold sections to their final reciprocal distance, of introducing a fluid under pressure into the tire and of exerting radial pressures on the tread of the tire by means of segments which also form part of the mold. These segments, which have projections corresponding to the impressions to be obtained on the tread, are moved radially towards the tire axis during the process.

The external lateral surfaces of these segments are inclined with respect to the mold axis and connected to corresponding surfaces of appropriate parts of a press on which the mold is mounted. Said joined surfaces are designed to move the segments radially when the surfaces are pushed by a plate provided on the press, after the two mentioned mold sections have moved towards each other. Besides controlling this radial movement of the segments, the press also controls the opening and closing movement of the mold, and must therefore have a very sturdy structure in order to withstand the strong forces transmitted to it and generated by the pressures inside the tire during the vulcanizing stage. In particular, to carry out this stage of the process, a vulcanizing fluid acts inside the tire in the mold at a very high pressure and this tends to move these segments outwards, radially. Consequently, if one wishes to prevent outward radial movement of these segments, which would produce flashes of elastomeric material between the connected faces of contiguous segments, this plate must maintain a sufficiently high locking force on the segments during the whole of this stage. Therefore, the parts which make up the press (the actual frame, operating mechanisms, gear wheels) have to be big, which makes the press bulky and expensive.

If one considers the fact that the time taken to vulcanize the tire is rather long, particularly in the case of large-size tires, costs relating to amortization and size of the press, for each tire produced on it, are found to be very high.

The purpose of the present invention is to provide an apparatus for molding an embossed pattern on the peripheral band of a toroiodal article, in particular on the tread of a tire to eliminate the problems mentioned.

In accordance with the present invention, an apparatus is used to mold an embossed pattern on the peripheral band of a toroidal article, in particular on the tread of a tire, comprising a mold, in which the article is vulcanized, and during this stage the pressures produced by a vulcanizing fluid act inside the article in the mold, this mold having two sections suitably arranged for molding the sidewalls of the article and a number of segments suitably arranged for molding the peripheral band of the article, characterized by comprising means for originating a forced elastic deformation between one or more parts of the mold, the forces produced by said forced elastic deformation being applied to these segments of the mold, these forces opposing the radial movements of these segments produced when the pressure of this vulcanizing fluid acts inside the article in the mold, just by said pressure. In this way, it is unnecessary to use one press for each mold as the mold itself contains the means for generating a sufficient amount of predetermined forces to effect the curing of the tire in an appropriate manner. Operating in accordance with prior art techniques, it had been necessary to use the press in combination with the mold during the entire curing period to offset the forces generated inside the mold caused by the pressure of the curing fluid.

These and other features of the present invention will be more evident from the following description made with reference to the attached drawings in which.

Figure 1:
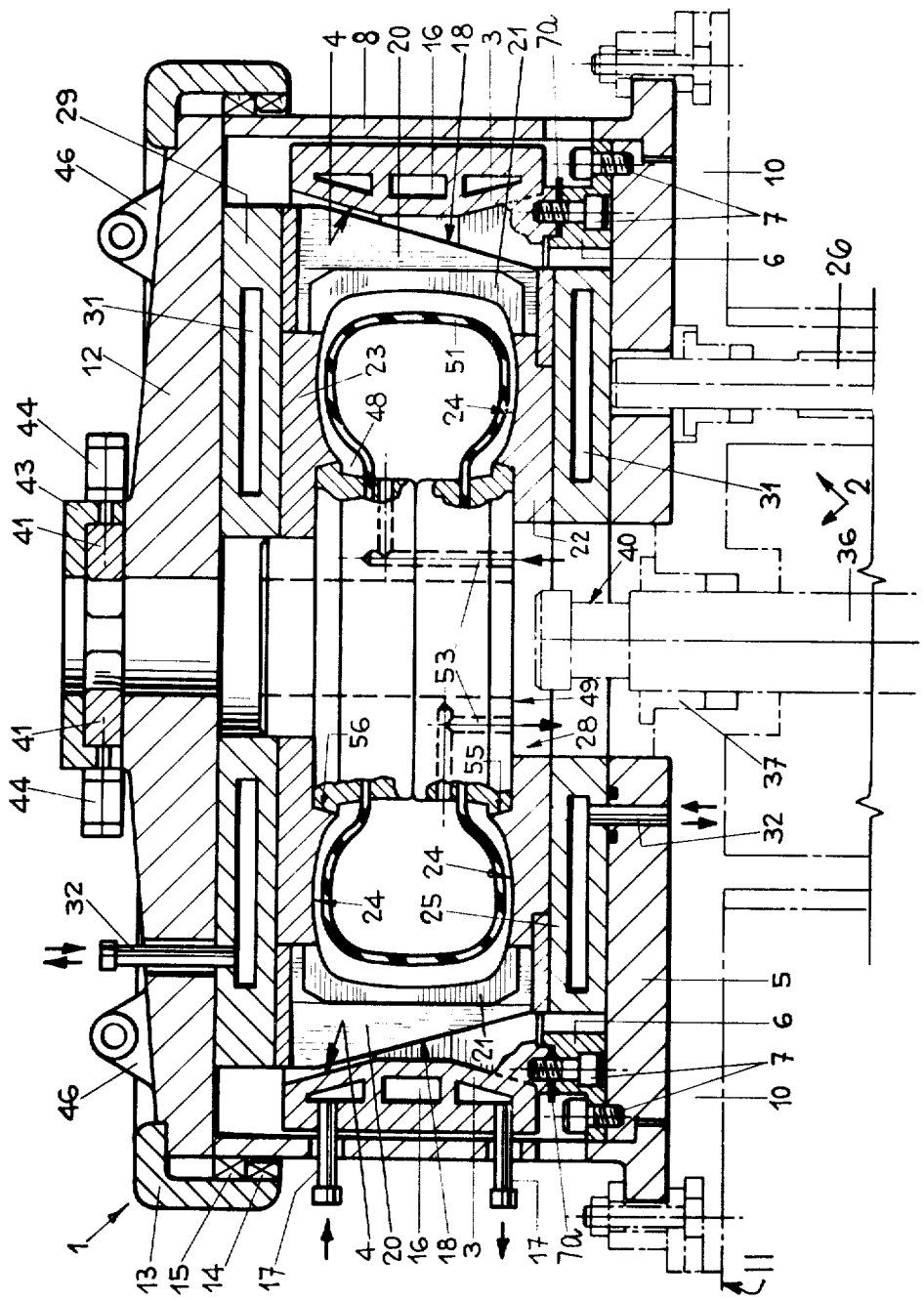
FIG. 1 shows a vertical section of the apparatus relating to the present invention, in closed condition.

With reference to FIG. 1, the apparatus relating to the invention basically consists of a mold 1, and means 2 arranged for operating the molds only. The means 2 can ordinarily be called a press. Obviously, the apparatus relating to the invention can consist of a plurality of molds of the type shown in FIG. 1.

As will be more clearly explained hereinafter, the mold 1, or each mold of a series, is brought into cooperation with the operating means (press) during a part of the process.

Figure 6:
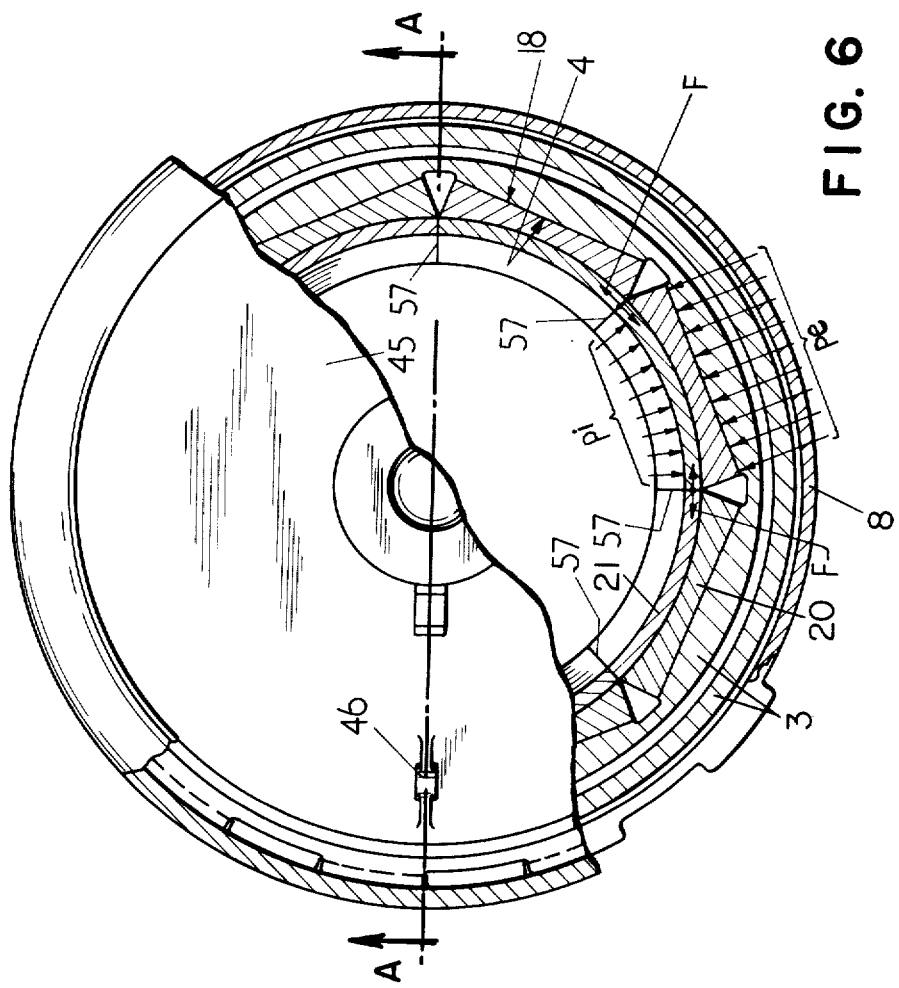
FIG. 6 is a plan view of the apparatus of FIG. 4 partly cut away, with a plane A—A.

The mold 1 comprises an annular section 3, the internal surfaces 4 of which are inclined with respect to the axis of the mold. Each of these surfaces forms a small angle with the axis of the section itself, i.e., 15°–20°. The section of these surfaces with a plane perpendicular to the mold axis can be seen in FIG. 6. This annular section is fixed to a frame 5 by an intermediate ring 6. Screws 7 connect the ring 6 both to the annular section 3 and to the frame 5. Adjustment washers 7a are placed between annular section 3 and ring 6.

A cylindrical housing 8 is connected to the frame 5. The housing 8 surrounds the annular section 3 and can be fixed, by any suitable means, to a bearing plate 10 which rests directly on a surface 11.

On the housing 8 can rest locking means which include a movable plate 12 on which a ferrule 13 can turn, having internal teeth 14 which can be engaged, in a way described hereinafter with the teeth 15 provided at the top and on the outside of the housing 8. Ferrule 13, by means of the teeth 14 and 15, locks the plate 12 to the housing 8. A chamber 16, for circulating the fluid, is formed inside the annular section 3 and is connected to pipes 17 which pass through the housing 8.

Each inclined surface 4 of the annular section 3 cooperates with a corresponding inclined surface 18 of a segment 20 having a matrix 21 in the inside. The matrix 21 has the pattern (not illustrated) which corresponds to that of the tread of the tire to be vulcanized inside the mold 1. Basically, the surfaces 18 have the same slope as the inclined surfaces 4 of the annular section 3. In the position shown in FIG. 2 (open condition of the mold), these segments are circumferentially separated from each other, whereas in the position shown in FIG. 1 (closed condition of the mold), the matrices 21 define a surface which corresponds entirely to that of the completely molded tread of the tire.

The mold halves, i.e., lower 22 and upper 23, have matrices 24, each of which basically defines one of the sidewalls of the tire. The lower mold half 22 lies on a ring 25, which in turn, lies on a number of vertically sliding rods 26, which form part of the operating means 2 of the mold. In the mold half 22 there is also a bore 28 and an annular seat 55 coaxial to it. The upper mold half 23 is fixed to the movable plate 12 by means of a ring 29 and has an annular seat 56 coaxial to the ring 29. Inside the rings 25 and 29 there is a chamber 31 for circulating a fluid, which is connected to the pipes 32.

In addition to the set of sliding rods 26, the operating means 2 or press (FIG. 1) also include a rod 36, guided by a bush 37 fixed to the bearing plate 10. The upper end of the rod 36, which can pass through the bore 28 of the lower mold half 22, can be fixed to the movable plate 12 by any suitable means. Conveniently, rod 36 can be provided with an annular groove 40 arranged to engage with two half rings 41, which slide in a seat formed in a bush 43 fixed to the movable plate 12.

Movement of these half rings, either to bring them together or separate them, is controlled by hydraulic cylinders 44 carried by the bushing 43. The movable plate 12 is provided with a pair of ears with bores 46, which enable the plate to be lifted together with the parts connected to it.

The apparatus operates as follows.

Figure 2:
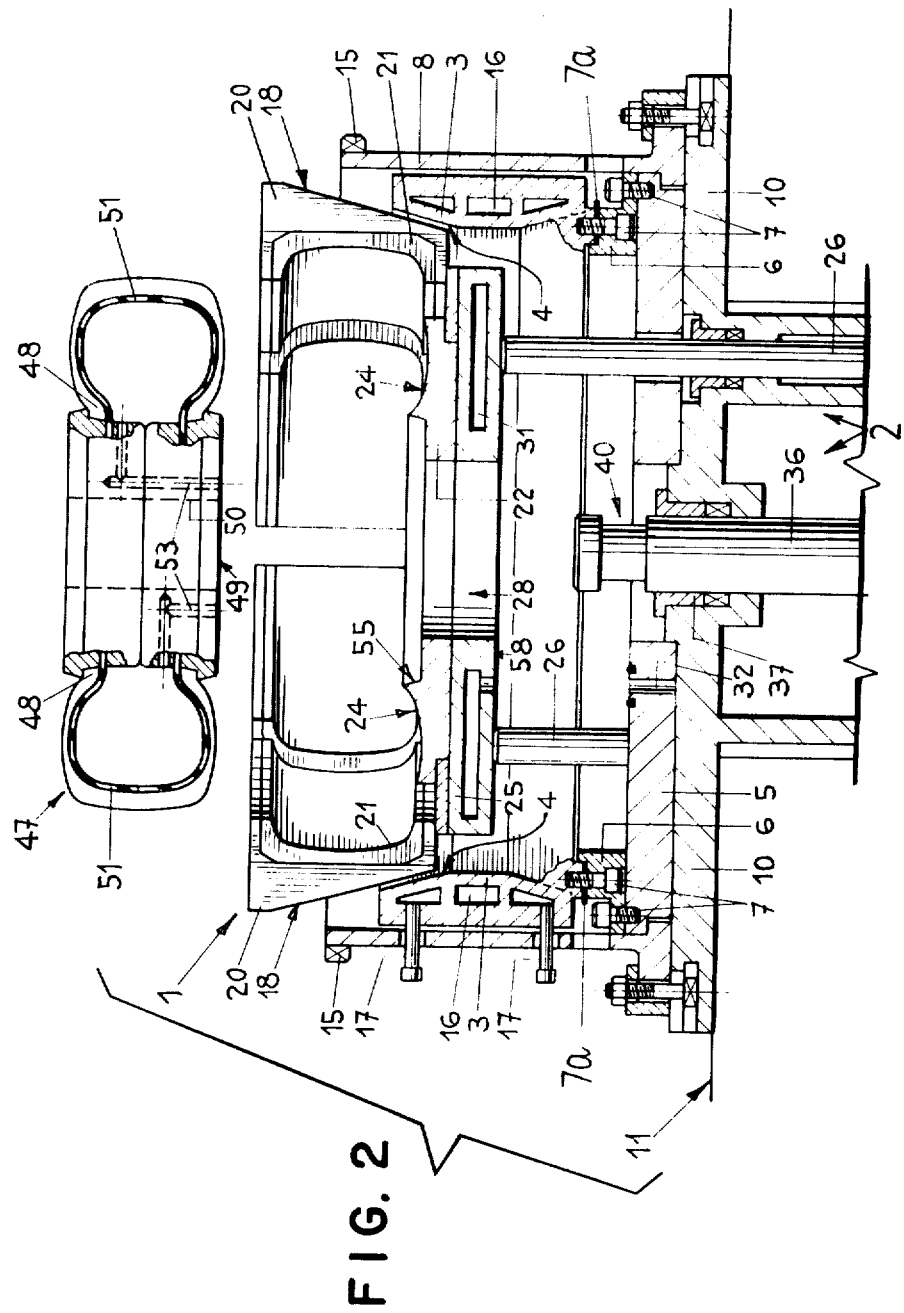
FIG. 2 shows a vertical section of the apparatus shown in FIG. 1, in its position at the beginning of the process, i.e., before a green tire is placed in it.

At the beginning of the process, the various parts of the mold herein described are in the position as shown in FIG. 2, i.e., the movable plate 12 is kept separated from the annular section 3 by suitable means (not shown), e.g., by a chain with hooks fixed in the bores of the ears 46 and operated by a crane. In this position, the rods 26 are in their upper limit position, so that both the mold half 22 with the ring 25 and the segments 20 resting on the latter are kept lifted. The inclined surfaces 18 of the segments 20 cooperate with the corresponding inclined surfaces 4 of the section 3 and these segments are circumferentially separated from each other. The rod 36 is in its lowest position.

The beads 48 of the green tire 47 to be vulcanized (which has been built up and shaped in a known way), have been previously locked in a supporting device 49 which is not illustrated in detail, being of a known type, and which generally consists of a tubular metal section 50 and a vulcanizing chamber 51 fixed to it. It is possible to introduce a pressurized fluid into the vulcanizing chamber 51 by means of the pipes 53.

At the beginning of the process, the supporting device 49 with the green tire 47 mounted on it in the described way, is positioned (FIG. 2) above the cavity defined by the segments 20. In this position, the device 49 is supported by means (not illustrated) which can be, for example, the same means which support the movable plate 12.

Figure 3:
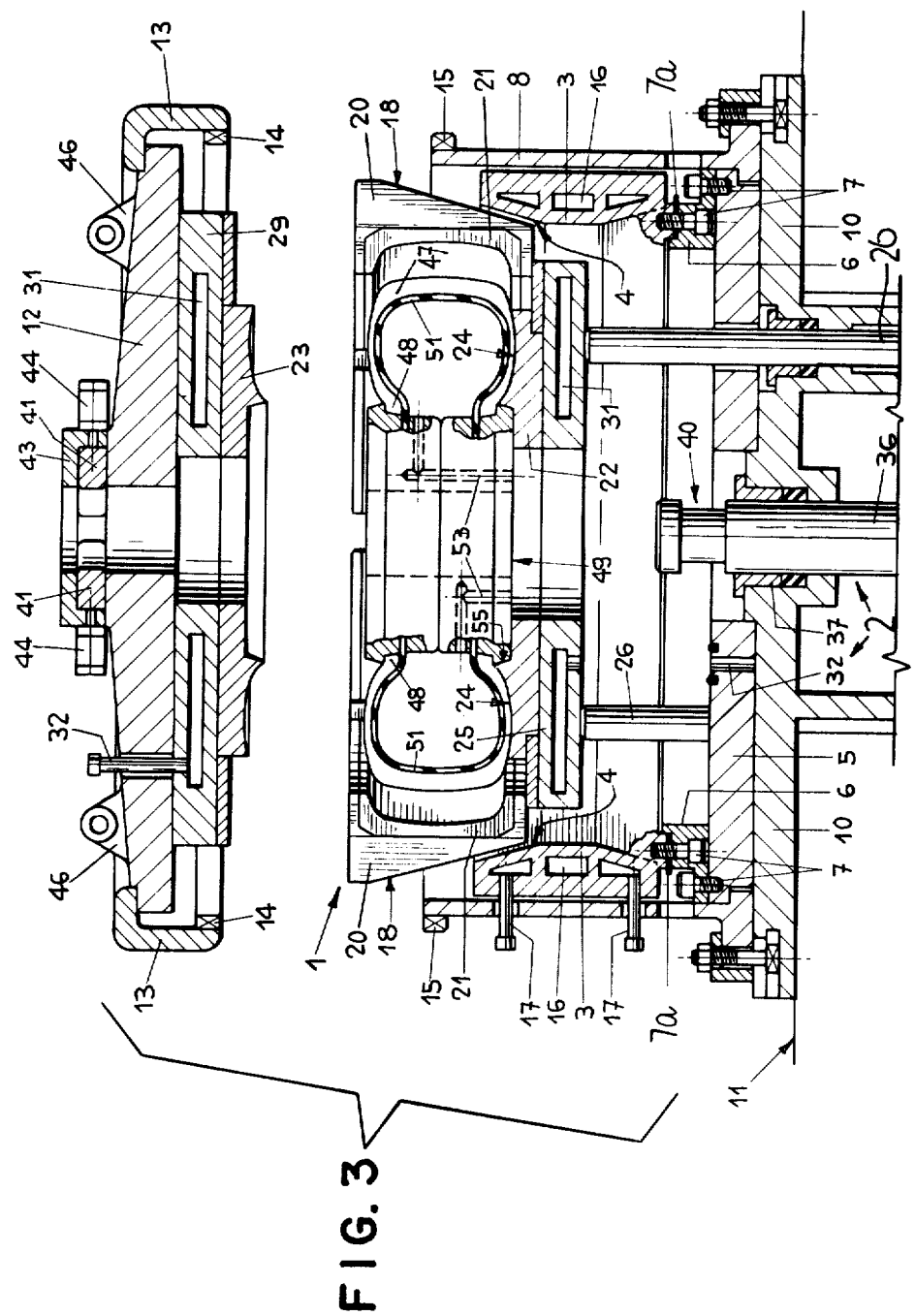
FIG. 3 shows a section similar to that of FIG. 2 of a part of the apparatus, at the end of a subsequent stage of the process, when the green tire is placed in the apparatus.

Then, the supporting unit 49 and the green tire 47 are lowered so that one sidewall of the tire lies on the matrix 24 of the lower mold half 22 (FIG. 3) and, at the same time, the unit 49 is introduced into the corresponding seat 55, which is coaxial to the bore 28 of the mold half. Then the movable plate 12 (FIG. 4) is lowered, bringing the upper mold half 23 in contact with the other sidewall of the green tire 47. In this condition, the upper portion of the supporting device 49 is positioned into the corresponding seat 56 in the mold half 23.

Figure 4:
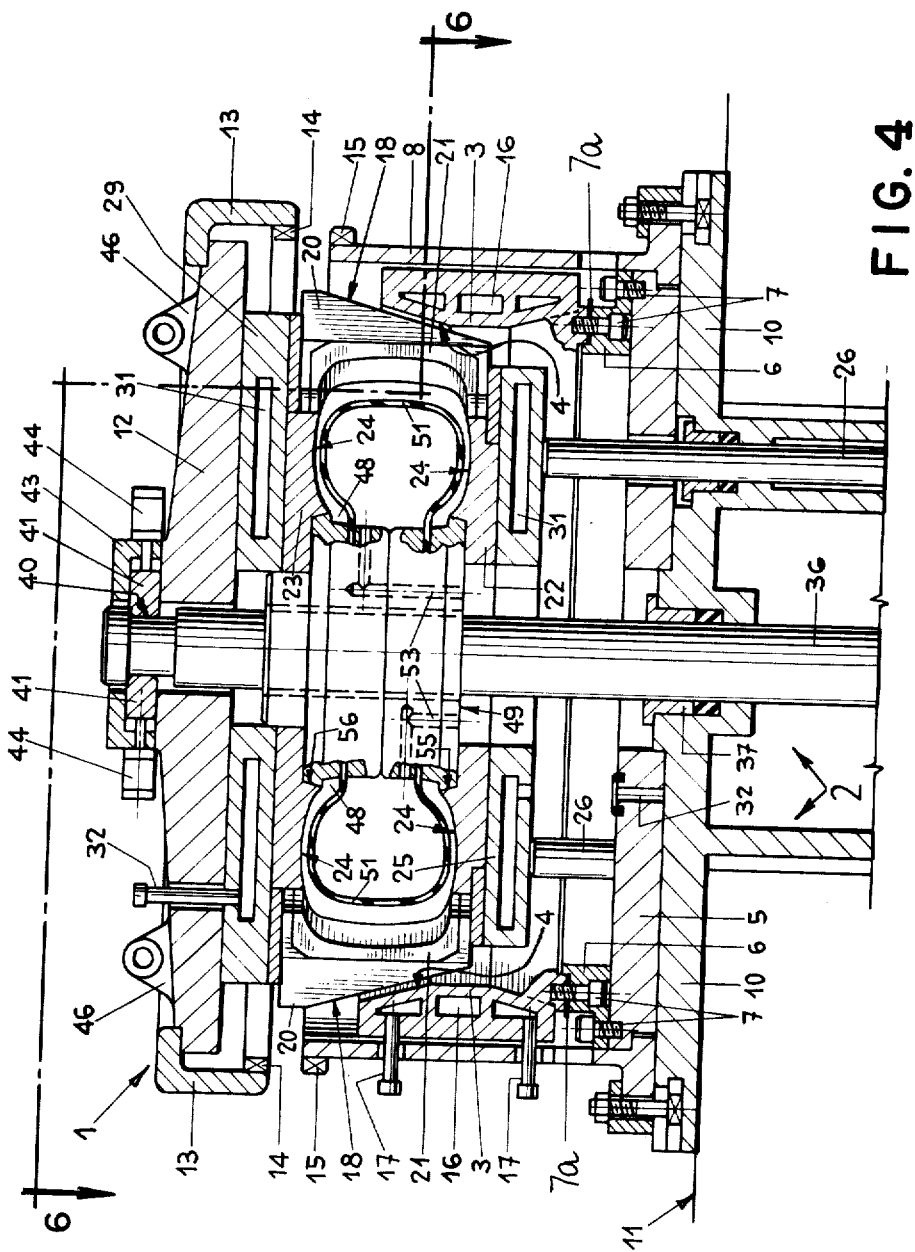
FIG. 4 shows a section similar to those of the previous illustrations of part of the apparatus, at the end of another stage, when a movable plate of the mold of the apparatus is brought into contact with the intermediate section of the mold.

At this stage in the process, the previously mentioned operating means (press) are put into operation in order to lift the rod 36 and take it to the position shown in FIG. 4. When the annular groove 40 at the top of the rod 36 coincides with the half rings 41, the hydraulic cylinders 44, which control the movement of these half rings, are operated to take them to the position shown in FIG. 4, where they lock the end of the rod.

Figure 5:
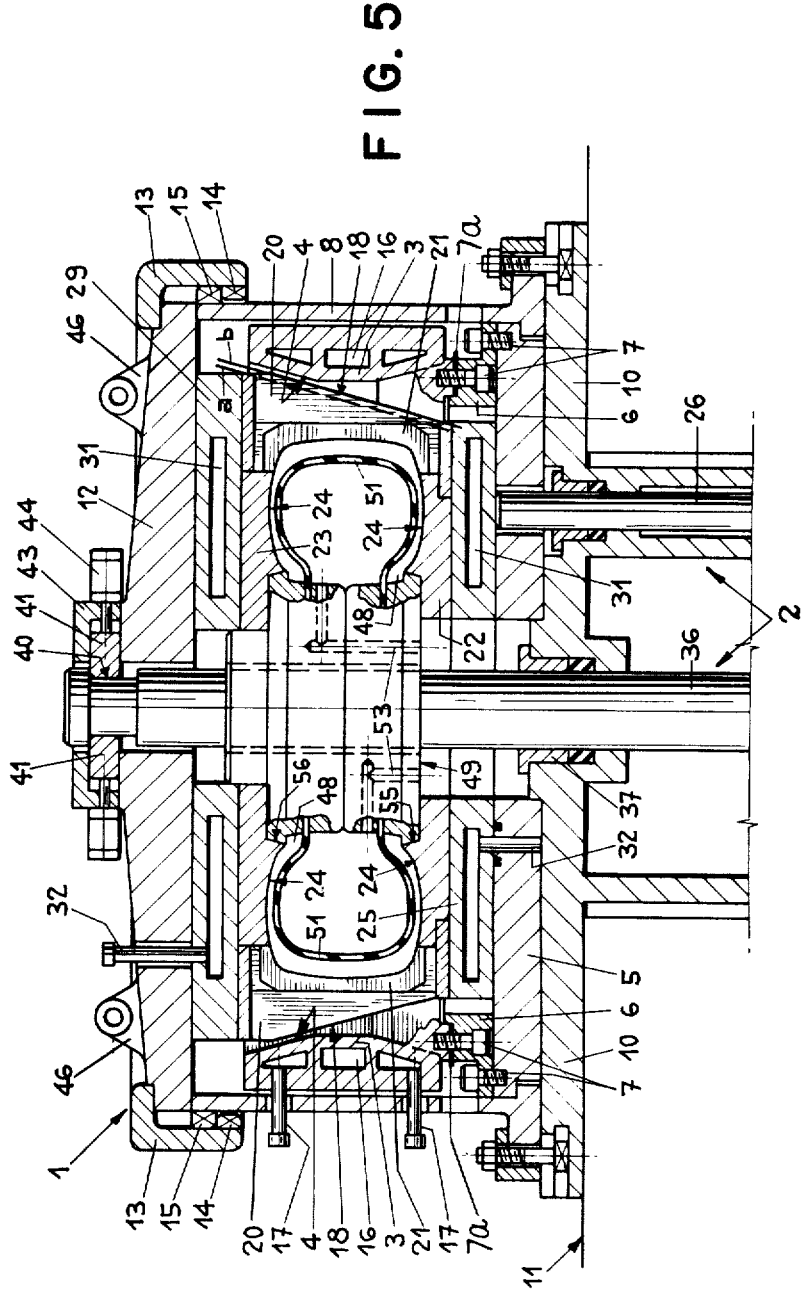
FIG. 5 is a section similar to that of the previous illustrations of a part of the apparatus with the mold in closed condition.

In the subsequent stage of the process (FIG. 5), the rod 36 is lowered, taking with it the plate 12 and the other parts of the mold connected to it. Following this downward movement, the inclined surfaces 4 of the annular section 3, close the segments 20. The inclined surfaces 4 operate as driving means to radially move the segments 20 in consequence of their radial displacements. At the beginning, the end faces 57 (FIG. 6) of the segments 20 are brought into contact, and later the annular section 3 is deformed elastically and radially.

In order to understand how this radial deformation of the annular section 3 does come about, it is necessary to consider the fact that the axial position of this section can be adjusted with respect to the frame 5, by means of the adjustment washers 7a. Therefore, it is obvious that this position can be adjusted so that at the beginning of the process, the inclined surfaces 4 of section 3 assume the position indicated by line a in FIG. 5. In view of the fact that when the lower face of the ring 25 comes into contact with the frame 5, the inclined surfaces 18 of the segments 20 are in the position indicated by b in FIG. 5, it is evident that, in this position, a certain interference, which can be indicated by i, exists between these tapered surfaces. The result is that, in the position shown in FIG. 5, there is a tight fit between segments 20 and annular section 3, produced by the interference $i$; this results in a radial outward deformation of the annular section 3 and consequently a tensile pre-loading of this section.

In the closed condition of the mold, the annular section 3 behaves substantially like a ring spring, able to exert radial pressure $p_e$ (FIG. 6) more or less at right angles to the connected inclined surfaces 4 and 18, on the segments 20.

However, with the tight fit between the segments 20 and the annular section 3 produced by the interference $i$, there is not only, as stated, a deformation of section 3, but also a deformation of the segments 20. Obviously, such deformations depend on the rigidity of the connected parts. However, it can be preferable for the tensile strength of section 3 to be lower than the compression resistance of the segments 20, so that it may be considered that only the annular section 3 is deformed. This simplification has no influence on the conclusions discussed concerning the behavior of the apparatus relating to this invention.

Therefore, it is obvious that, under these conditions, the annular section 3 of the mold 1 is subjected to a very high tensile pre-load, produced, as has been said, by the interference $i$. If it is supposed that no pressures other than those transmitted through contact with the annular section 3 (indicated by $p_e$ in FIG. 6) are applied to the segments 20, forces $F$ are produced between the connected face 57 of two contiguous segments, the value of which obviously depends on that of the interference $i$. If however, as happens in the case of the apparatus relating to the present invention, radial pressures $p_i$ (FIG. 6), produced by the pressurized fluid introduced into the vulcanizing chamber 51, act on the internal surface of each segment, these pressures, transmitted by the segments 20 to the annular section 3, tend to deform and to further load the latter. The result is that the value of the force $F$ transmitted between the connected surfaces 57, diminishes and is completely eliminated by considerably high internal pressures $p_i$.

The value of the interference $i$ and the dimensions of the annular section 3 are chosen in such a way that with the pressure $p_i$ of the operating fluid acting inside the vulcanizing chamber (51), as required to vulcanize the green tire 47, the forces $F$ transmitted between the faces 57 assume a pre-established value. In this way, as a result of the forces $F$, the connected surfaces 57 do not detach from one another and consequently the formation of flashes on the finished tire, at these faces, is prevented. This is achieved by originating a compression stress by part of the driving means, the inclined surfaces 4. Therefore, it can be understood that by pre-loading the annular section 3, in accordance with the invention, it is possible to carry out the vulcanizing process — with very high pressures — without the need to have the mold kept closed by the known presses used at present, which are to be very sturdy and consequently very expensive.

One should also bear in mind that when, in addition to the internal pressure $p_i$, the external pressure $p_e$ also acts on the segments 20 (FIG. 6), there is no appreciable radial movement of these segments, nor, consequently, of the matrices 21 fixed to them. For the purpose of this invention, locking means already known are used, which locks the plate 12 and the housing 8 together during molding and vulcanizing of the green tire 47. In actual fact, the ferrule 13 is made to rotate so that its teeth 14 engage with the teeth 15 of the housing 8.

Now, by reversing the operations described, the annular groove 40 of the rod 36 is released from the half rings 41 and the rod 36 is then returned to the position which is shown in FIG. 2 and which is also indicated in FIG. 1 by the dotted lines.

Figure 7:
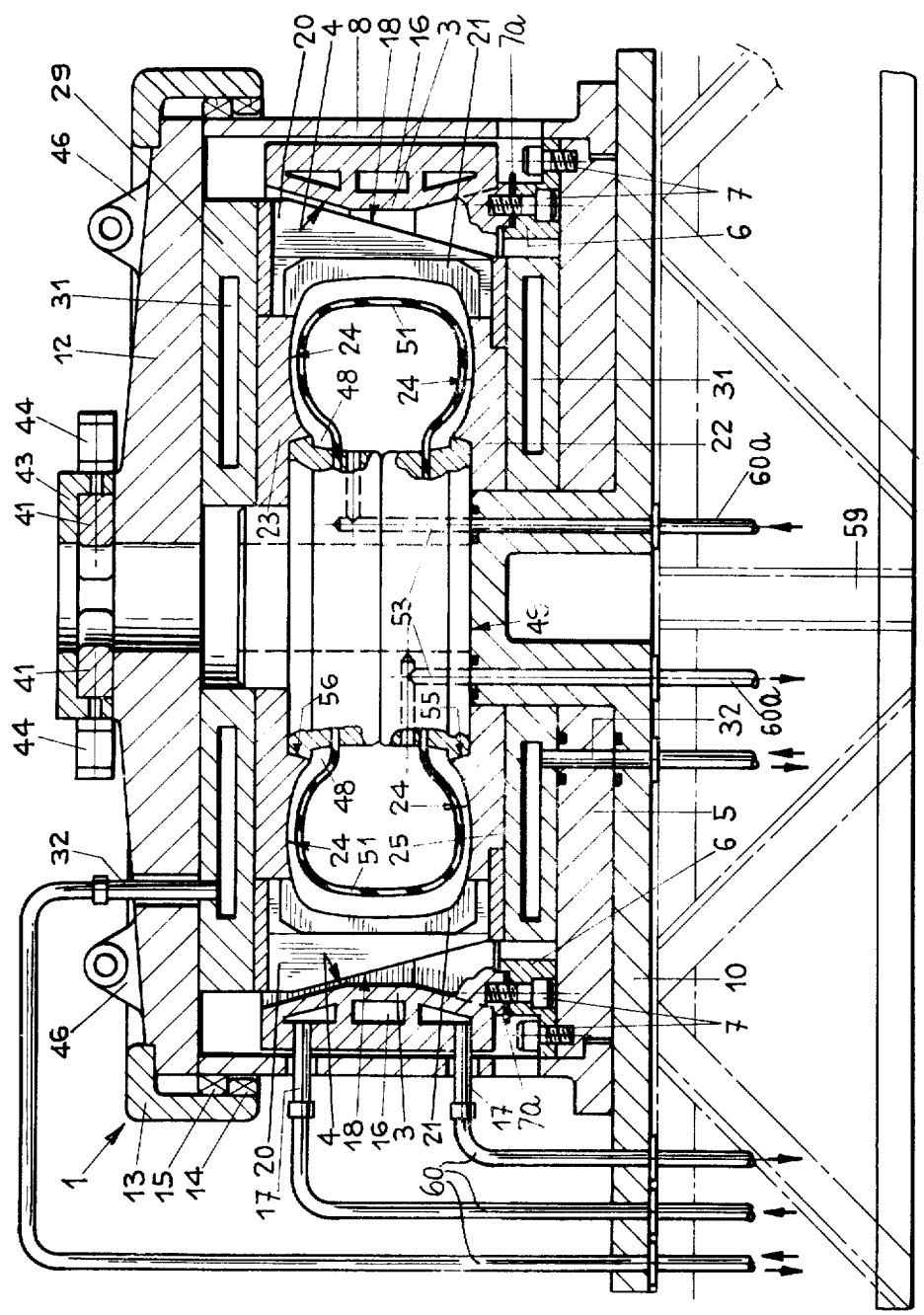
FIG. 7 shows a vertical section of the mold of the apparatus, removed from the corresponding operating devices and arranged on a stand during the vulcanizing stage of the tire.

Subsequently, the mold 1 can be released from the supporting plate 10, detached from the operating means (press) 2 and taken to a suitable place where the green tire 47 inside it can vulcanize. This mold can simply be placed on a suitable support 59, as illustrated in FIG. 7, and the tubes 17 and 32 connected, by means of suitable pipes 60, to a source of high pressure and high temperature fluid suitable for vulcanizing the green tire 47. This fluid can circulate inside the mold through the chambers 16 and 31, provided in the annular section 3 and in the rings 25 and 29, respectively. The tubes 53 leading to chamber 51 are also connected, by means of pipes 60$a$, to a suitable source of fluid, operating at a high pressure and high temperature but usually different from that of the fluid supplied through the pipes 60. The fluid supplied through the pipes 60$a$ and the tubes 53 into the vulcanizing chamber 51 is usually steam with a pressure $p_i$ of approximately 30 kg/cm², and a temperature of approximately 200°C.

Figure 8:
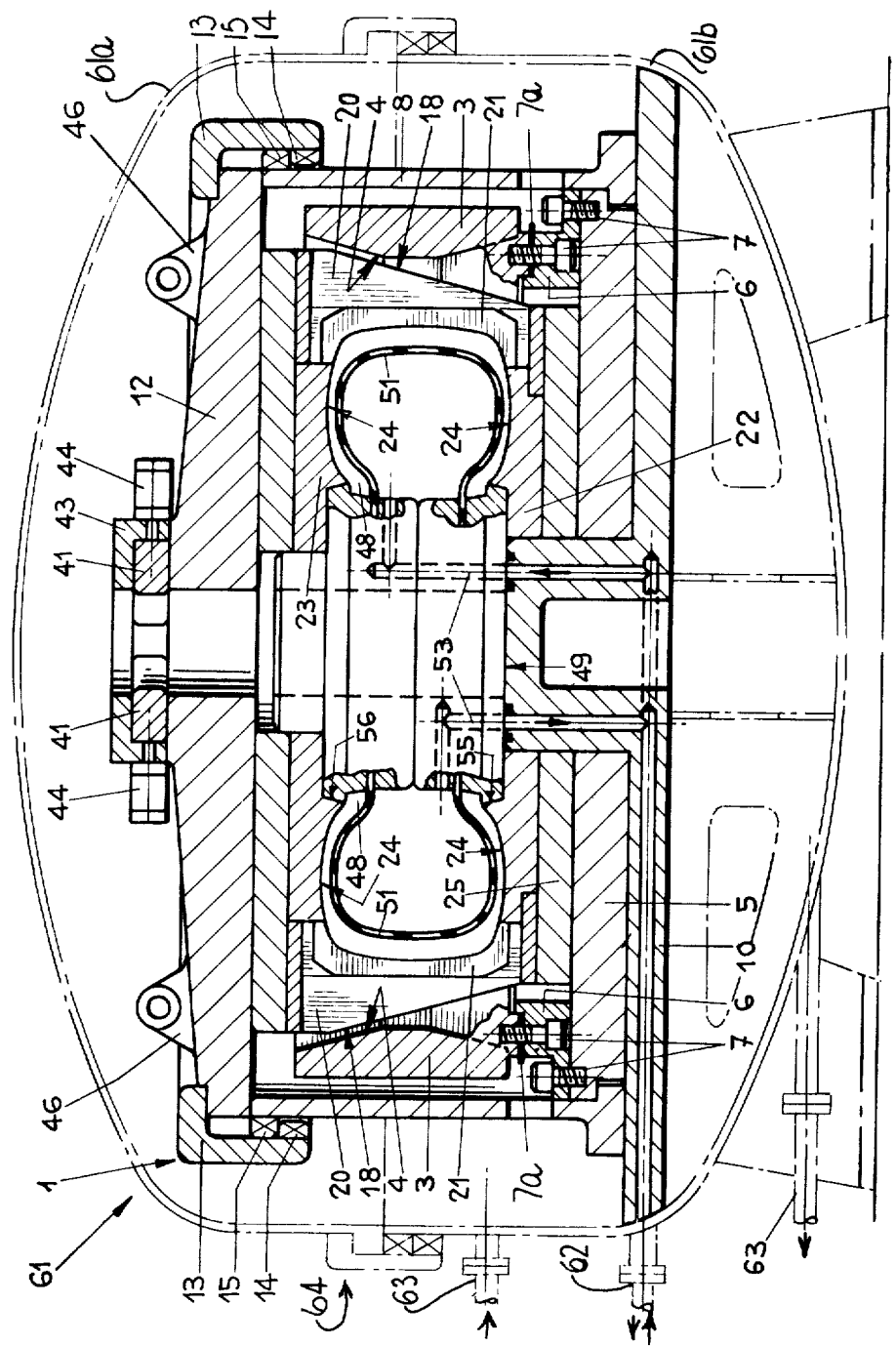
FIG. 8 shows the vertical section of a mold like that of FIG. 7, placed inside a box where the vulcanizing stage is carried out.

According to an alternative embodiment, illustrated in FIG. 8, the mold 1 is arranged inside a box 61 which is connected, by means of pipes 62 and 63, to the supply of pressurized and hot fluid.

The box 61 comprises two sections 61$a$ and 61$b$ which have locking means 64.

If the green tire is vulcanized in a different place from where the mold is closed, when this process is complete, the mold 1 is removed from the support 59, as shown in FIG. 7, or from the box 61, as shown in FIG. 8, and replaced on the supporting plate 10 illustrated in FIG. 2, where it is reconnected to the operating means 2. In any case, even if the green tire is vulcanized and the mold closed in the same place, the segment unit 20 is first of all removed from the annular section 3 (which, being elastically deformed, reverts to the initial dimensions), then the upper mold half 23, together with the plate 12 is lifted, the above described means (press) being operated in the opposite way to that previously described. In this way, the apparatus reverts to the position illustrated in FIG. 3. Finally, the tire which has been vulcanized is removed from the mold by known means (not illustrated).

It is understood that in addition to the preferred embodiment of the process and in addition to the alternative arrangement described above, any variation based on the inventive principles which have been described, come within the scope of the present invention. For example, teeth 14 and teeth 15 are provided, on their mutually facing surfaces (namely, respectively, on their upper surface and on their lower surface), with planes inclined with respect to the median plane of tire 47 (which is perpendicular to the mold axis) and parallel to one another. There is moreover, a hydraulic cylinder (not illustrated) arranged tangentially to ferrule 13 secured to its stem, and fast with the annular housing 8. Therefore, after having brought the mold to its closed condition, the rotation of ferrule 13 on plate 12 is obtained by actuating said cylinder. In consequence of said rotation, teeth 14 slide on teeth 15 until they tightly engage. By appropriately selecting the cylinder's power, it is possible to obtain in this way also the interference *i*, namely the forded connection between segments 20 and the annular section 3.

What is claimed is:

1. In an apparatus for molding an embossed pattern on the peripheral band of a toroidal article, in particular on the tread of a tire, said apparatus comprising
    a mold having upper and lower sidewall sections arranged to press the sidewalls of the article, and an intermediate section comprising a plurality of segments arranged to press the peripheral band of the article itself, when the mold is closed,
    driving means for radially moving said segments in consequence of their axial displacements,
    a press for opening and closing the mold,
    means for admitting and discharging a curing fluid at a suitable temperature and pressure with respect to said article to obtain curing of said article, the improvement which comprises
    said driving means having means for originating a compression stress between the connected faces of at least two contiguous segments when the mold is assembled before molding and curing and having means for originating a reduction of said stress during molding and curing while always maintaining said connected faces of said contiguous segments in direct mutual contact whereby molding and curing can be effected outside of said press and
    locking means for mutually engaging said upper and lower sidewall sections with said driving means when the mold is assembled.

2. The apparatus of claim 1 wherein said driving means for originating said compression stress comprise at least an annular section which surrounds said plurality of segments, said section having an inner diameter such that an interference of pre-established value occurs between the inner surface thereof and the corresponding faces of said segments when the mold is closed before molding and curing, said pre-established value of the interference being at least that which prevents separation of the connected faces of said contiguous segments when the vulcanizing pressure acts inside the article in the mold.

3. The apparatus of claim 2 wherein the pre-established value of the interference is variable by means capable of carrying out an adjustment of the axial position of said annular section with respect to said segments.

4. The apparatus of claim 3 wherein the means for carrying out an adjustment of the axial position of said annular section comprise
    a frame on which said lower sidewall section rests, when the mold is assembled,
    connecting means connecting said annular section to said frame, and
    adjustment washers inserted between said annular section and said frame.

5. The apparatus according to claim 2 further comprising an upper plate, movable in the direction of the mold axis, said plate being arranged to move said segments and to lock itself to the annular section by said locking means when the mold is assembled.

6. The apparatus of claim 5 wherein said locking means comprise a ferrule rotating on said upper plate and provided with a number of radial teeth and
    a cylindrical housing provided with a number of teeth, connected to said annular section and containing said mold, wherein locking is accomplished by the sliding contact of the teeth of the cylindrical housing with the teeth of the ferrule.

7. The apparatus of claim 6 wherein said teeth have mutually facing surfaces shaped along lines parallel to one another and inclined with respect to a plane perpendicular to the mold axis and further wherein means are provided to cause the mutual engagement of said teeth in order to vary the axial position of said segments with respect to said annular section and consequently the value of the compression stress exerted on same.

8. The apparatus of claim 5 wherein chambers are formed inside said annular section and said plate to permit circulation of said fluid at a suitable temperature and pressure to vulcanize the article in the mold.

* * * * *